United States Patent
Grimm

(10) Patent No.: US 7,641,281 B2
(45) Date of Patent: Jan. 5, 2010

(54) VEHICLE SEAT HAVING BACKREST WIDTH ADJUSTMENT AND INTEGRATED SEAT AIRBAG

(75) Inventor: Markus Grimm, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/940,676

(22) Filed: Nov. 15, 2007

(65) Prior Publication Data

US 2008/0088159 A1 Apr. 17, 2008

Related U.S. Application Data

(63) Continuation of application No. PCT/EP2006/003070, filed on Apr. 5, 2006.

(30) Foreign Application Priority Data

May 31, 2005 (DE) ................ 10 2005 024 774

(51) Int. Cl.
  B60N 2/42 (2006.01)
  B60N 2/427 (2006.01)
  B60R 21/00 (2006.01)
  B60R 21/16 (2006.01)
  A47C 7/18 (2006.01)
  A47C 7/46 (2006.01)

(52) U.S. Cl. ................ 297/216.13; 297/284.9; 297/452.33; 297/452.34; 297/452.35

(58) Field of Classification Search ............. 297/284.9, 297/452.33, 452.34, 452.35, 216.13
See application file for complete search history.

(56) References Cited

U.S. PATENT DOCUMENTS 5,860,673 A * 1/1999 Hasegawa et al. ... 297/216.13 X
5,893,579 A * 4/1999 Kimura et al. ...... 297/216.13 X
5,967,603 A * 10/1999 Genders et al. ........ 297/216.13

(Continued)

FOREIGN PATENT DOCUMENTS

DE 90 14 111.3 U1 1/1991

(Continued)

OTHER PUBLICATIONS

International Search Report dated Jun. 27, 2006 (Seven (7) Pages).

(Continued)

*Primary Examiner*—Rodney B White
(74) *Attorney, Agent, or Firm*—Crowell & Moring LLP

(57) ABSTRACT

A vehicle seat having a backrest, which has a backrest middle part and backrest side parts, which extend forward laterally from the backrest middle part and are provided for lateral body support is described. The backrest side parts each have an internal section connected to the backrest middle part and an external section connected thereto, which overlaps a forward area of the backrest side part. The backrest side parts are adjustable in relation to the backrest middle part so that the backrest width is changeable by fixing the backrest side parts. The internal section and the external section are produced in one piece from a foam material. A stiffening element is foamed into the internal section and into the external section in a transition area between the internal section and the external section, which is primarily provided to give the external section a certain rigidity.

19 Claims, 3 Drawing Sheets

U.S. PATENT DOCUMENTS

| | | | |
|---|---|---|---|
| 5,988,674 A * | 11/1999 | Kimura et al. | 280/730.2 |
| 6,062,593 A * | 5/2000 | Satani et al. | 297/216.13 X |
| 6,095,602 A * | 8/2000 | Umezawa et al. | 297/216.13 X |
| 6,129,419 A | 10/2000 | Neale | |
| 6,357,789 B1 * | 3/2002 | Harada et al. | 297/216.13 X |
| 6,386,577 B1 * | 5/2002 | Kan et al. | 297/216.13 X |
| 6,439,597 B1 * | 8/2002 | Harada et al. | 297/216.13 X |
| 6,450,528 B1 * | 9/2002 | Suezawa et al. | 280/730.2 |
| 6,513,828 B2 | 2/2003 | Aulbach | |
| 6,578,911 B2 * | 6/2003 | Harada et al. | 297/216.13 |
| 6,588,838 B1 * | 7/2003 | Dick et al. | 297/216.13 |
| 7,216,934 B1 * | 5/2007 | Kobari | 297/284.9 |
| 7,232,150 B2 * | 6/2007 | Nagayama | 297/216.13 X |

FOREIGN PATENT DOCUMENTS

| | | |
|---|---|---|
| DE | 100 10 024 A1 | 9/2001 |
| DE | 100 52 942 A1 | 5/2002 |
| DE | 100 56 961 A1 | 6/2002 |
| DE | 203 06 153 U1 | 9/2003 |
| DE | 103 45 834 A1 | 4/2005 |
| EP | 0 343 025 A1 | 11/1989 |
| GB | 2 397 047 A | 7/2004 |
| JP | 57-186534 A | 11/1982 |

OTHER PUBLICATIONS

German Search Report dated May 30, 2006 with English translation (Nine (9) Pages).

* cited by examiner

VEHICLE SEAT HAVING BACKREST WIDTH ADJUSTMENT AND INTEGRATED SEAT AIRBAG

CROSS REFERENCE TO RELATED APPLICATIONS

This application is a continuation of PCT International Application No. PCT/EP2006/003070, filed Apr. 5, 2006, which claims priority under 35 U.S.C. § 119 to German Patent Application No. 10 2005 024 774.1 filed May 31, 2005, the entire disclosures of which are herein expressly incorporated by reference.

BACKGROUND AND SUMMARY OF THE INVENTION

The present invention relates to a vehicle seat having a backrest middle and side parts which extend laterally from the middle part.

Modern vehicles are typically equipped with multiple airbags. In addition to airbags which are situated in the steering wheel or in the dashboard, there are seat airbags which are to protect the passenger in the event of a side impact. Seat airbags are increasingly replacing the door airbags situated behind door side panels in older vehicles.

It is expected of premium vehicles, in particular, that the vehicle seats are adaptable to the body as perfectly as possible, similarly to a tailored suit, to offer high seat comfort and good lateral hold or restraint to every passenger. Simultaneously, the vehicle seats are to meet the high safety requirements of modern vehicles.

A vehicle seat having a backrest middle part and backrest side parts, which may be adjusted in relation to the backrest middle part by an electromechanical adjustment apparatus, is known from German Patent Document DE 103 45 834.4 (not previously published), which is expressly incorporated herein its entirety, the backrest width being able to be changed by adjusting the backrest side parts. An airbag module is situated in one of the backrest side parts. A tear seam is provided in a forward external area of this backrest side part. When the airbag is triggered, the tear seam is torn open by the pressure of the airbag. The airbag may then unfold toward a forward seat area. To meet the safety standards placed on the seat airbag, the tear seam must be subjected to careful quality control in the manufacturing process, which is connected with significant costs.

According to the present invention, a vehicle seat which is adjustable in its backrest width, and which is producible at low manufacturing and quality control outlay is described.

Although the present invention is primarily described in the following in connection with a width-adjustable seat backrest, a shown in the drawings, it is expressly noted that the present invention is also suitable for a width-adjustable seat cushion.

In one exemplary embodiment, the present invention may include a vehicle seat having a backrest which has a backrest middle part and two backrest side parts, which extend forward laterally from the backrest middle part and are provided for lateral body support. The backrest side parts each have an internal section connected to the backrest middle part and an external section connected thereto, which overlaps a forward area of the particular backrest side part. The internal section may be convexly curved. However an "indented," i.e., concavely curved internal section may also be used. The backrest side parts are situated so they are adjustable in relation to the backrest middle part in such a way that the backrest width of the vehicle seat is changeable by adjusting the backrest side parts.

An important aspect of the exemplary embodiment of the present invention is that the internal section and the external section of at least one of the two backrest side parts are produced in one piece from a foam material, a stiffening element being "foamed in" in the internal section and the external section at least in a transition area between the internal section and the external section. When reference is made in the following description to "foamed in," the term "foamed in" is to be understood broadly in the meaning that "foamed on" and "glued on" are also included, even without the latter terms expressly being used. The stiffening element is provided for the purpose of giving the transition area between the internal section and the external section as well as the external section per se a certain rigidity. In regard to the possibility of adjusting the backrest width, the external section of the backrest side part is to have a certain flexibility. On the other hand, however, it is to be ensured that the external area of the backrest side part maintains its shape, i.e., remains taut, over the entire service life of the motor vehicle.

According to a refinement of the present exemplary embodiment, an airbag module may be situated in a rear area of the seat-exterior backrest side part. The term "seat-exterior backrest part" is to be understood as the backrest part which faces toward the vehicle exterior side or the vehicle door in the vehicle and faces away from the vehicle center. In the event of airbag triggering, the exemplary airbag exits from the backrest side part and unfolds past the external section of the seat-exterior backrest part in the direction toward a forward seat area.

According to a refinement of the present exemplary embodiment, the backrest middle part and the backrest side parts may be covered by a decorative material, e.g., a textile material or leather. The decorative material is tensioned over the internal section and the external section of the seat-exterior backrest side part and wrapped around a rear end of the external section of the seat-exterior backrest part. The wrapped-around end of the exemplary decorative material is fixed on an interior side of the external section of the seat-exterior backrest part on the external section. The wrapped-around end may be hung, clipped, glued, or attached in another way to the interior side of the external section.

The vehicle seat in this example preferably has a backrest rear wall, which has a seat-interior side face and a seat-exterior side face. The side faces extend from the rear side of the vehicle seat laterally forward to the backrest side parts. The side faces at least partially overlap the rear areas of the side parts. The seat-exterior side face preferably extends at least far enough forward that it overlaps the airbag module from the outside. The seat-exterior side face has a certain bending elasticity and only extends far enough forward that upon the airbag triggering, the airbag may exit securely from the backrest side part and may unfold forward externally past the external section of the seat-exterior backrest side part.

The airbag module may be attached to a support structure or to a frame of the seat backrest. The support structure or the frame may be a welded or bent construction. The "support structure" may also be produced from sheet metal and pipes.

In the normal state according to this embodiment, i.e., when the seat airbag has not been triggered, the forward end of the seat-exterior side face of the backrest rear wall and the rear end of the external section of the seat-exterior backrest part may essentially abut one another and/or slightly overlap one another viewed from the outside.

As described above, the backrest side parts in an exemplary embodiment may be situated so they are adjustable in relation to the backrest middle part. For design reasons, it may be ensured that the airbag module, the support structure of the seat backrest, and other seat components situated in the backrest are not visible from the outside, even when the backrest side parts are extended entirely "forward to the inside," i.e., when the seat backrest is set to its minimal backrest width. For this purpose, a screen element may be provided. The screen element may be implemented in such a way that it has a first leg-like section and a second leg-like section. For example, it may have an L-shaped cross-section. A first leg of the screen element may be situated in such a way that it at least partially overlaps a front side of the airbag module. A second leg of the screen element may extend in an area between the interior side of the external section of the exterior backrest side part and the support structure. It is ensured by a screen element of this type that even when the backrest side parts are entirely extended, the airbag module and the support structure of the seat backrest are not visible from the outside.

Other objects, advantages and novel features of the present invention will become apparent from the following detailed description of the invention when considered in conjunction with the accompanying drawings.

BRIEF DESCRIPTION OF THE DRAWINGS

In the following, the present invention is explained in greater detail in connection with the drawings.

DETAILED DESCRIPTION OF THE DRAWINGS

Figure 1:
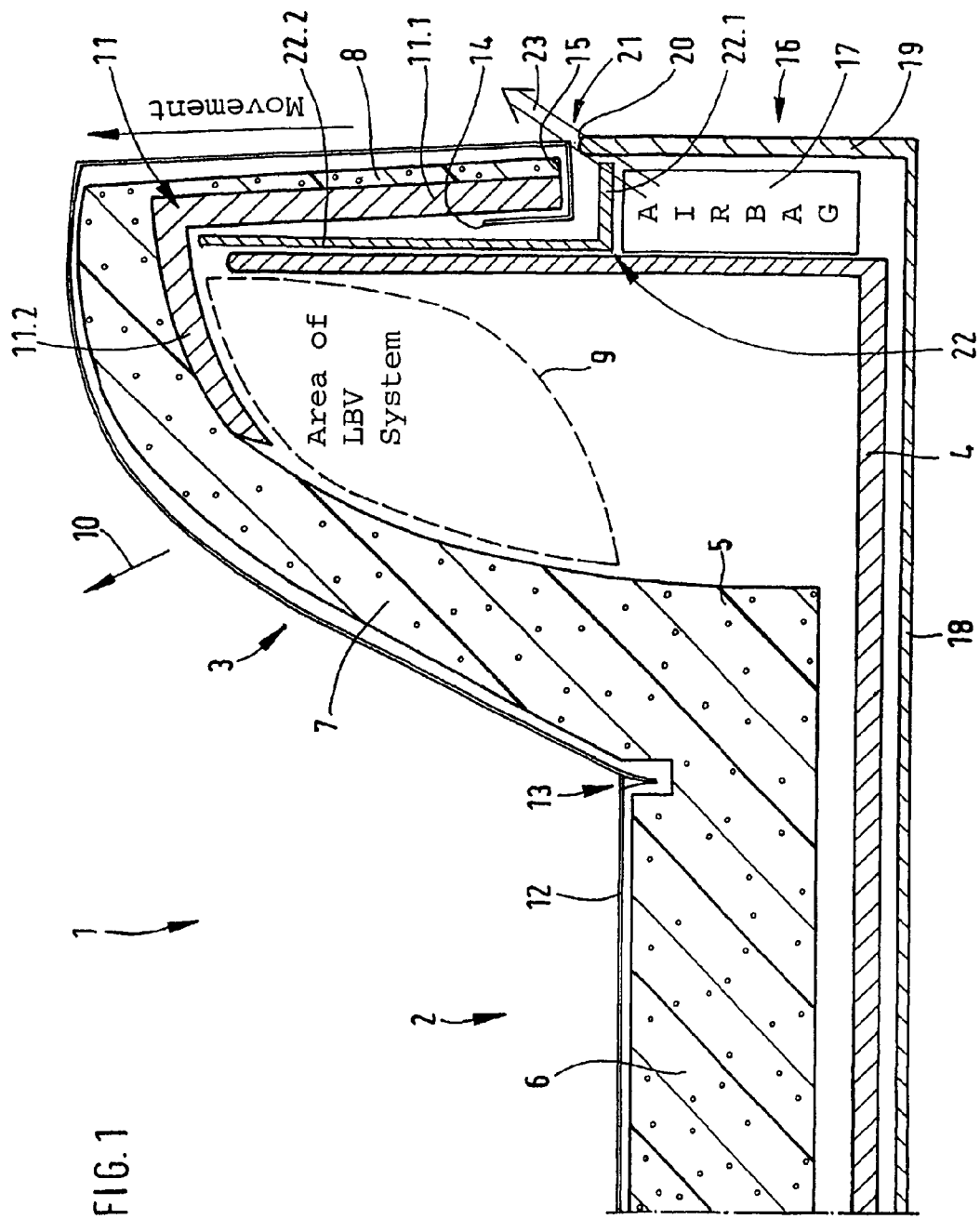
FIG. 1 shows a cross-section through the backrest of a vehicle seat according to an embodiment of the present invention with retracted backrest side part.

FIG. 1 shows a cross-section through the backrest 1 of a vehicle seat. The exemplary backrest 1 has a backrest middle part 2 and two backrest side parts, of which only a seat-exterior backrest side part 3 is shown here. The term "seat-exterior backrest side part 3" is to be understood as the side part which faces toward the vehicle exterior side and faces away from the vehicle center when the seat is installed in a vehicle.

In one exemplary embodiment, the backrest 1 may have a support structure or a backrest frame 4. The support structure or the backrest frame 4 may be produced from sheet metal or metal pipes in the form of a bent and/or welded construction. The backrest frame 4 is used for attaching the remaining components of the backrest 1.

The backrest middle part 2 and the backrest side part 3 may include a foam layer 5. The foam layer 5 may be divided into multiple sections connected to one another in one piece. In the exemplary embodiment shown in FIG. 1, one may differentiate a section 6 assigned to the backrest middle part 2, an internal section 7 which is convexly curved, and is provided for back or lateral body support, as well as an external section 8 connected to the internal section 7. The sections 7, 8 of the foam part may be interpreted as two "legs," similar to the legs of a "U."

A backrest width adjustment apparatus 9 (not shown in greater detail here) may be situated in the area between the internal section 7 and the external section 8. The backrest width adjustment apparatus 9 may be formed by a displacement mechanism, for example, which is attached to the backrest frame 4 and using which the backrest side part 3 may be moved in a direction 10 diagonally forward or to the rear, which allows a change of the backrest width. The backrest width adjustment apparatus may be formed, for example, by a mechanism as described in German Patent Application DE 103 45 834.4 of the applicant, cited above.

As an alternative to a backrest width adjustment mechanism, backrest width adjustment hydraulics or backrest width adjustment pneumatics may be provided in different embodiments of the invention. For example, a "bubble" may be integrated in the backrest side part, which may be "inflated" by pumping in air or another gas or a liquid. A larger or smaller backrest width results depending on the fill level of the bubble.

As is shown in the example of FIG. 1, the external section 8 of the foam layer may be comparatively thin. To give the external section 8 a certain desired rigidity, for example, in particular a certain bending rigidity, an L-shaped or hooked stiffening part 11 may be injection molded or foamed into the foam layer 5. The stiffening part 11 has a first leg 11.1 and a second leg 11.2. The first leg 11.1 of the stiffening part 11 may be foamed into the external section 8 or foamed onto the external section 8. The second leg 11.2 may be foamed into the section 7 or foamed onto the section 7. The stiffening element 11 extends like a hinge from the section 7 via the transition area located between the sections 7, 8 to the section 8. The stiffening part 11 provides the section 8 with increased rigidity.

The exemplary backrest 1 is covered by a decorative material 12. The decorative material may be a textile material, natural leather, artificial leather, or a similar substance. The decorative material is tensioned over the backrest middle part 12 into a backrest fold 13. The decorative material 12 is tensioned from the backrest fold 13 over the internal section 7 and the external section 8 of the foam layer. One end 14 of the decorative material 12 is wrapped around a rear end 15 of the section 8 and/or the leg 11.1 of the reinforcement element 11 and attached to the interior side of the leg 8 of the foam layer 5 and/or to the interior side of the leg 11.1 of the reinforcement element 11. The wrapped-around end 14 may be hung, glued, or connected in another way to the reinforcement element 11 and/or to the leg 8.

In one embodiment, an airbag module 17 is situated in a rear area 16 of the seat-exterior backrest side part 3. The airbag module 17 is attached to the frame 4 of the backrest. The airbag module 17 may be screwed, riveted, or attached in another conventional manner to the frame 4.

The exemplary backrest 1 also has a backrest rear wall 18, which is provided on both sides with one side face each. Only the seat-exterior side face 19 is shown of the two side faces in FIG. 1. The seat-exterior side face extends from a rear side of the backrest forward and overlaps a rear area of the seat-exterior side part 3 from the side. In the exemplary embodiment shown in FIG. 1, the seat-exterior side face 19 extends far enough forward that it overlaps the airbag module 17 seen from the exterior. A forward end 20 of the side face of the backrest rear wall 18 essentially abuts the rear end 15 of the external section 8 of the seat-exterior backrest side part 3. A small gap 21 remains between the forward end 20 of the side face 19 and the rear end 15 of the external section 8 of the seat-exterior backrest side part 3.

For design reasons, a screen element 22 may be provided in this exemplary embodiment, which has an L-shaped cross-section having a first leg 22.1 and a second leg 22.2. The first leg 22.1 of the screen element 22 overlaps a front side of the airbag module 17. The second leg 22.2 of the screen element 22 extends into an area between the interior side of the external section 8 of the seat-exterior backrest side part 3 and the support structure or the frame 4 of the backrest. The screen element 22 is primarily provided for design reasons and prevents the airbag module 17 or the frame 4 from being seen through the gap 21 from the outside.

In the event of triggering of the exemplary airbag module, an airbag module housing (not shown) is torn open by the pressure of the airbag. The side face 19, the leg 22.1 of the screen element 22, and the exterior section 8 of the seat-exterior backrest side part 3 are pressed apart in such a way that the airbag exits in the direction of the arrow 23 from the backrest side part 3 and unfolds externally past the external section 8 toward a forward seat area.

Figure 2:
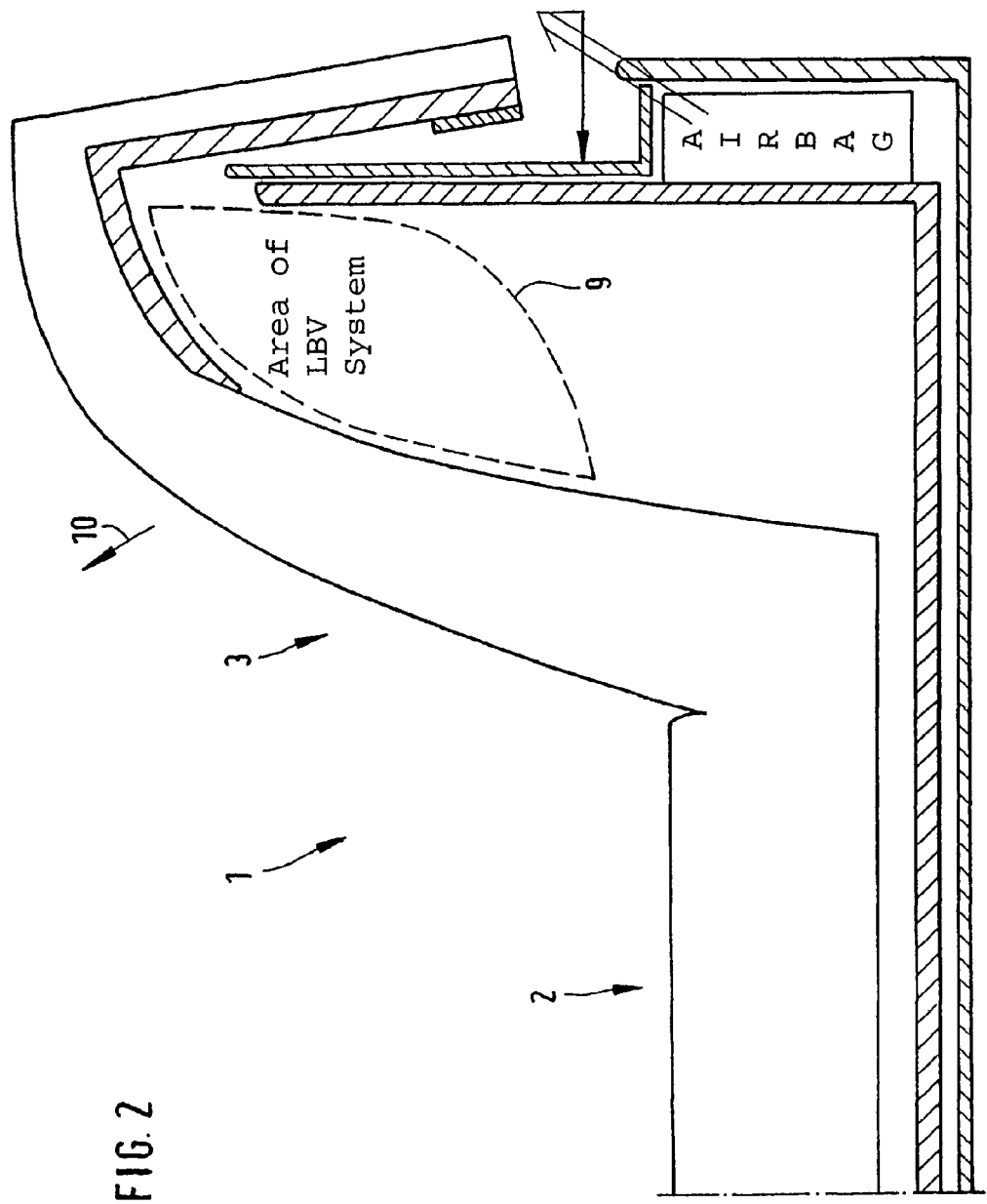
FIG. 2 shows a cross-section through the backrest with extended backrest side part.

FIG. 2 shows an exemplary embodiment of the backrest 1 of FIG. 1, the backrest side part 3 being moved diagonally forward in the direction of the arrow C in relation to the backrest middle part 2 here. In this position of the backrest side part 3, the backrest width is somewhat less than in the position shown in FIG. 1. The backrest 1 provides better lateral hold in this position.

Figure 3:
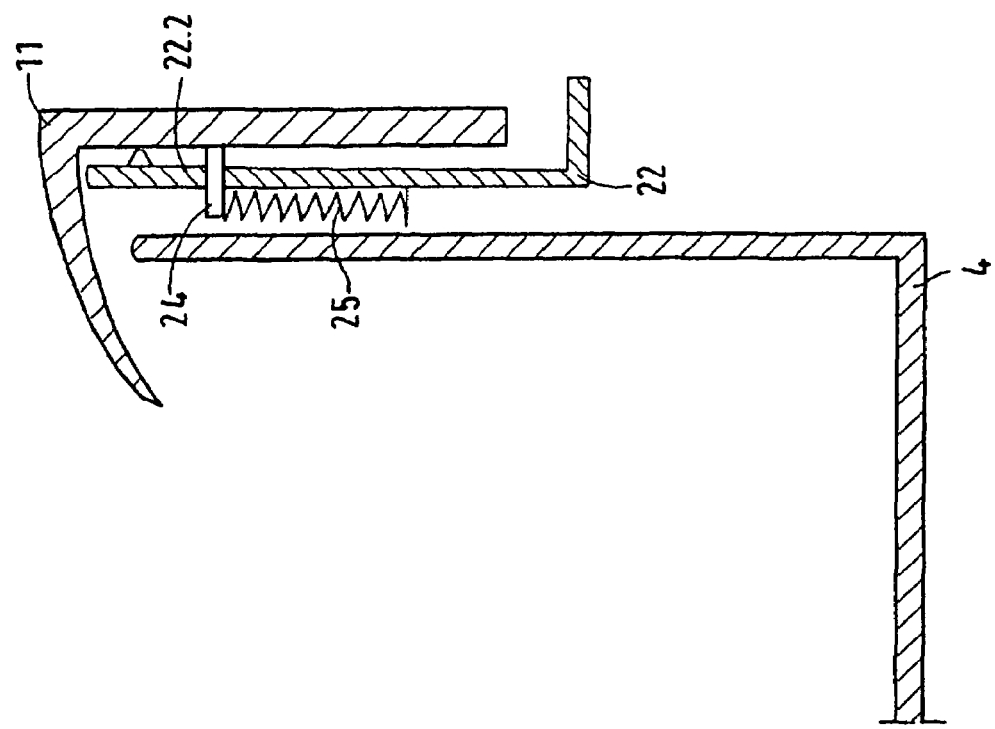
FIGS. 3 and 4 show exemplary embodiments in which the external section of the backrest side part is linked using a restoring spring.

FIG. 3 shows a variant of the exemplary embodiment of FIGS. 1 and 2. In the exemplary embodiment shown in FIG. 3, a longitudinal slot is provided in the leg 22.2 of the screen element 22 and in a partial section 4.1 of the frame 4. A pin (shown schematically), which is connected to the leg 11.1 of the reinforcement element 11, extends through the longitudinal slot. A spring 25, whose other end 26 is connected to the section 4.1 of the frame 4, is hung on the free end of the pin 24.

When the exemplary backrest side part 3 is to be returned from the position shown in FIG. 2 to its starting position shown in FIG. 1, the tension spring 25 supports the "retraction movement."

Figure 4:
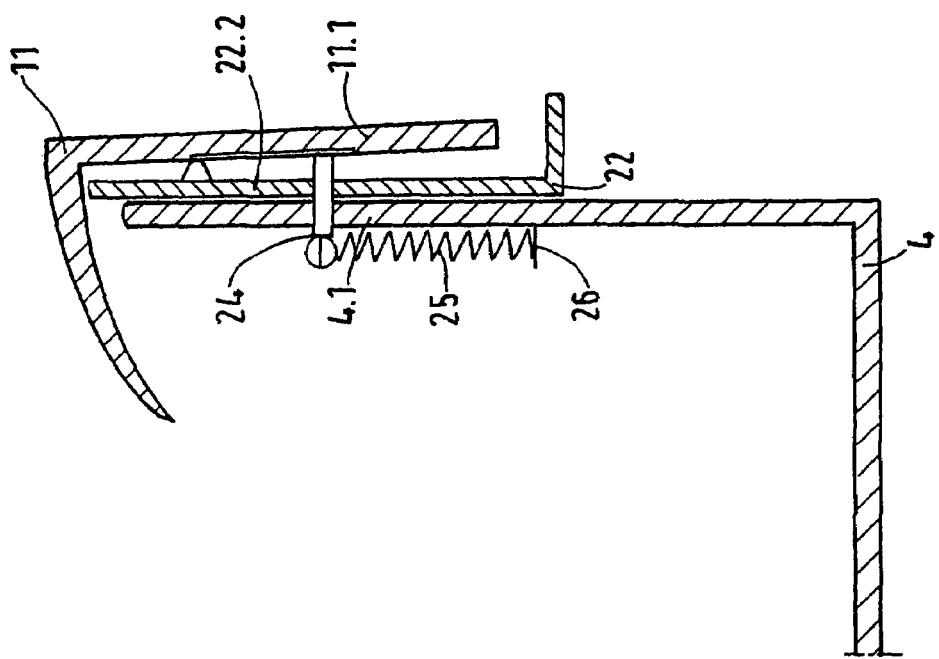

FIG. 4 shows a variant of the exemplary embodiment of FIG. 3. In this exemplary embodiment, a slot, through which the pin 24 extends, is only provided in the leg 22.2 of the screen element 22. One end of the spring 25 is hung directly on the screen element 22 here. The other end of the spring 25 is hung on the free end of the pin 24, as in FIG. 3. Corresponding to FIG. 3, the spring 25 supports the retraction of the backrest side part, i.e., the retraction from the position shown in FIG. 2 to the position shown in FIG. 1.

It is to be expressly noted that the invention described in connection with the embodiments shown in FIGS. 1-4 using the example of a seat backrest 1, is applicable not only to backrests, but rather also to width-adjustable "seat cushions," i.e., to width-adjustable "seat surfaces" of vehicle seats.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat having a backrest comprising:
a backrest middle part of the backrest;
backrest side parts, which extend forward laterally from the backrest middle part and provide lateral upper body support;
an internal section of each of the backrest side parts, connected to the backrest middle part and an external section of the backrest side parts connected thereto, which overlaps a forward area of the backrest side parts, the backrest side parts being situated to be adjustable in relation to the backrest middle part wherein a backrest width is changeable by fixing the backrest side parts;
wherein the internal section and the external section are formed in one piece from a foam material, a stiffening element selected to give the external section a desired rigidity being foamed into the internal section and into the external section, the stiffening element extending at least across a transition area from the internal section to the external section, and having rigid first and second legs forming a hinge extending from the internal section.

2. A vehicle seat having a backrest comprising:
a backrest middle part of the backrest;
backrest side parts, which extend forward laterally from the backrest middle part and provide lateral upper body support;
an internal section of each of the backrest side parts, connected to the backrest middle part and an external section of the backrest side parts connected thereto, which overlaps a forward area of the backrest side parts, the backrest side parts being situated to be adjustable in relation to the backrest middle part wherein a backrest width is changeable by fixing the backrest side parts;
wherein the internal section and the external section are formed in one piece from a foam material, a stiffening element selected to give the external section a desired rigidity being foamed into the internal section and into the external section at least in a transition area between the internal section and the external section, and further comprising an airbag module disposed in a rear area of the backrest side part, an airbag thereof, in the event of airbag triggering, unfolding externally around the stiffening element and past the external section of the backrest side part to a forward seat area.

3. The vehicle seat according to claim 2, wherein the vehicle backrest comprises a backrest rear wall, which has a seat-interior side face and a seat-exterior side face, which at least partially overlap the rear areas of the backrest side parts.

4. The vehicle seat according to claim 3,
wherein the seat-exterior side face extends forward at least sufficiently to overlap the airbag module from the outside.

5. The vehicle seat according to claim 2, further comprising a screen element for concealing the airbag module positioned in an area between a rear end of the external section of the backrest side part and the airbag module.

6. The vehicle seat according to claim 5, the screen element has a first leg, which at least partially overlaps a front side of the airbag module, and a second leg, which extends in an area between the interior side of the external section of the backrest side part and the support structure, and conceals the support structure from the outside.

7. The vehicle seat according to claim 1, wherein the backrest middle part and the backrest side parts are covered by a decorative material, the decorative material being tensioned over the internal section and the external section of the backrest side part, wrapped around a rear end of the external section of the backrest side part, and fixed on an interior side of the external section of the backrest side part, on the external section.

8. The vehicle seat according to claim 7, wherein the decorative material is hung on the interior side of the external section of the backrest side part, on the external section, using a hanging apparatus.

9. The vehicle seat according to claim 1, wherein the vehicle backrest comprises a support structure produced from metal, and the airbag module is attached to the support structure.

10. The vehicle seat according to claim 1, wherein a forward end of the side face of the backrest rear wall substantially abuts a rear end of the external section of the backrest side part.

11. A vehicle seat having a backrest comprising:
a backrest middle part of the backrest;
backrest side parts, extending forward laterally from the backrest middle part and providing lateral upper body support;
an internal section of each of the backrest side parts, connected to the backrest middle part, and an external section of the backrest side parts connected thereto, overlapping a forward area of the backrest side parts, the backrest side parts being adjustable in relation to the backrest middle part to change a backrest width by adjusting the backrest side parts,
wherein the internal section and the external section are formed in one piece from a foam material, and a stiffening element selected to give the external section a desired rigidity being foamed into the internal section and into the external section, at least in a transition area between the internal section and the external section, and
wherein the backrest side parts are connected to a support structure via a sliding guide.

12. The vehicle seat according to claim 11, wherein the sliding guide is curved in such a way that the backrest side parts rotate inward as the backrest side parts slide forward away from the backrest rear wall, reducing the backrest width.

13. The vehicle seat according to claim 1, wherein the backrest side parts are movable by a cable pull actuatable by an electric motor.

14. A vehicle seat having a seat cushion comprising:
a cushion middle part of the seat cushions;
cushion side parts which extend laterally upward from the cushion middle part and are provided for lateral thigh support;
an internal section of each of the cushion side parts connected to the cushion middle part;
an external section of each of the cushion side parts connected thereto, which overlaps an upper area of each cushion side part, the cushion side parts being positioned to be adjustable in relation to the cushion middle part in such a way that the seat width of the cushion part is changeable by adjusting the cushion side parts;
wherein the internal section and the external section are formed in one piece from a foam material, a stiffening element provided to give the external section a desired rigidity being foamed into the internal section and into the external section, the stiffening element extending at least in a transition area from the internal section to the external section, and having rigid first and second legs forming a hinge extending from the internal section.

15. The vehicle seat according to claim 14, wherein the cushion side parts and the cushion middle part are covered by a decorative material, the decorative material being tensioned over the internal section and the external section of the cushion side parts, wrapped around a rear end of the external section, and being fixed on an interior side of the external section of the cushion side parts.

16. The vehicle seat according to claim 14, wherein the cushion side parts are connected to a support structure of the vehicle seat via a sliding guide.

17. The vehicle seat according to claim 14, wherein the cushion side parts are movable by a cable pull actuatable by an electric motor.

18. A vehicle seat having a seat cushion comprising:
a cushion middle part of the seat cushions;
cushion side parts which extend laterally upward from the cushion middle part and are provided for lateral thigh support;
an internal section of each of the cushion side parts connected to the cushion middle part;
an external section of each of the cushion side parts connected thereto, which overlaps an upper area of each cushion side part, the cushion side parts being positioned to be adjustable in relation to the cushion middle part in such a way that the seat width of the cushion part is changeable by adjusting the cushion side parts;
wherein the internal section and the external section are formed in one piece from a foam material, a stiffening element provided to give the external section a desired rigidity being foamed into the internal section and into the external section, the stiffening element extending at least in a transition area from the internal section to the external section, and having rigid first and second legs forming a hinge extending from the internal section,
further comprising an airbag module situated in a rear area of the seat-exterior cushion side part, an airbag thereof, in the event of airbag triggering, unfolding externally around the stiffening element and past the external section of the seat-exterior cushion side part toward an upper seat area.

19. The vehicle seat according to claim 18, further comprising a screen element for concealing the airbag module.

\* \* \* \* \*